United States Patent
Wilson et al.

(10) Patent No.: US 7,103,747 B2
(45) Date of Patent: Sep. 5, 2006

(54) MEMORY TABLE AND MEMORY MANAGER FOR USE IN MANAGING MEMORY

(75) Inventors: Kenneth Mark Wilson, San Jose, CA (US); Robert B. Aglietti, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 761 days.

(21) Appl. No.: 09/896,043

(22) Filed: Jun. 28, 2001

(65) Prior Publication Data
US 2003/0005257 A1 Jan. 2, 2003

(51) Int. Cl.
*G06F 12/10* (2006.01)

(52) U.S. Cl. ........................................ 711/206; 711/202
(58) Field of Classification Search ................. 711/202, 711/203, 206, 207, 209, 221
See application file for complete search history.

(56) References Cited

U.S. PATENT DOCUMENTS 6,088,758 A * 7/2000 Kaufman et al. ........... 711/100
6,314,501 B1 * 11/2001 Gulick et al. ............... 711/153

* cited by examiner

*Primary Examiner*—Gary Portka
(74) *Attorney, Agent, or Firm*—Tuan V. Ngo

(57) ABSTRACT

The present invention, in various embodiments, provides techniques for managing memory in computer systems. One embodiment uses a memory table having entries to locate data residing in different types of storage areas, such as physical memory, hard disc, file servers, storage devices, etc. Upon a program accessing memory for a particular piece of data, the memory table translates the data's physical address to an address used to find the table entry pointing to the requested data. In one embodiment, if the data is in physical memory, then the requested data is returned to the program. However, if the data is not in physical memory and it is determined that the data will be used frequently, then the data, in addition to being returned, is also brought to the physical memory for later use. This is because accessing the data from physical memory usually takes less time than accessing the data from other storage devices.

20 Claims, 6 Drawing Sheets

MEMORY TABLE AND MEMORY MANAGER FOR USE IN MANAGING MEMORY

FIELD OF THE INVENTION

The present invention relates generally to computer memory management and, more specifically, to a memory table and associated memory manager for use in such management.

BACKGROUND OF THE INVENTION

Virtual memory, which is an imaginary memory area supported by the operating system of a computer, increases the set of addresses a program can use. Usually, this set of addresses is referred to as the address space and is divided into units or pages. While virtual addresses are used to access virtual memory, physical addresses are used to locate data stored in physical locations or physical memory corresponding to the virtual addresses. Contemporary computers commonly use translation look-aside buffers or tables to cache virtual to physical page address translations. As program applications grow in size and their data requirements increase, the number of pages required by the applications and hence the number of translations that need to be cached in the translation look-aside buffer increases. Unfortunately, the translation look-aside buffer is often the cycle-time limiter in processors and increasing its size exacerbates the problem.

To limit the number of entries needed in a translation look-aside buffer and thereby reducing its cycle time, designers usually increase the size of memory pages, which decreases the number of entries the translation look-aside buffer needs to contain. This is because a given amount of memory can be represented by fewer pages. However, this approach also increases the time needed for moving a memory page and the number of page faults, which occur when a memory page is accessed but the page is not in memory. In addition, larger pages in memory, especially those of gigabyte sizes, result in more chance that large fractions of the page are not used by the portion of the applications currently executing. This leads to inefficient use of memory.

Some approaches have balanced the disparate needs of large page sizes, small number of translation look-aside buffer entries, and penalties due to moving or copying large pages. However, in these approaches, translation look-aside buffers are still cycle time limiters. "Super pages" have been investigated to combine multiple smaller pages to create one larger page, which combines several translation look-aside buffer entries into one and allows each individual page creating the super page to be stored in noncontiguous memory locations. Nevertheless, all pages are usually stored in system memory or swap memory, which refers to storage areas for data that is not in system memory. Normally, the operating system, during execution of a program, keeps as much data in the system memory as possible, and leaves the rest of the data somewhere else, e.g., in a hard disc. When the system needs the data, it swaps some of the data in system memory with some of the data in the disc.

Current approaches using the operating system to manage memory result in very complex systems and inefficient management of memory. The operating system has to deal with the discussed-above problems in trade-offs between page size and translation look-aside buffer misses. The operating system usually does not know the latency and/or bottleneck at the hardware level several layers away from the operating system, and it is yet responsible for managing the memory, especially memory swapping, which occurs at the hardware level. In many situations, memory swapping requires many complicated steps, but the processor has to wait for all the steps, and thus the swap, to complete before the processor can access the data in swap memory. The operating system commonly treats physical memory as a black box, and therefore in many situations cannot make informed decisions in managing the memory, including page placement. This also increases the complexity of the operating system. Based on the foregoing, it is clearly desirable that mechanisms be provided to solve the above deficiencies and related problems.

SUMMARY OF THE INVENTION

The present invention, in various embodiments, provides techniques for managing memory in computer systems. One embodiment uses a memory table having entries to locate data residing in different types of storage areas, such as physical memory, hard disc, file servers, storage devices, etc. Upon a program accessing memory for a particular piece of data, the memory table translates the data's physical address to an address used to find the table entry pointing to the requested data. In one embodiment, if the data is in physical memory, then the requested data is returned to the program. However, if the data is not in physical memory and it is determined that the data will be used frequently, then the data, in addition to being returned, is also brought to the physical memory for later use. This is because accessing the data from physical memory usually takes less time than accessing the data from other storage devices.

In one embodiment, a memory manager in the form of a state machine or a processor is used in conjunction with the memory table. The memory manager manages various tasks such as storing the data, determining when, how and where to move the data between the system memory and a storage area, collecting statistic used to move a particular piece of data, etc. Normally, the memory manager performs its tasks in the background, e.g., independent from and/or in parallel with the system processor.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

The present invention, in various embodiments, provides techniques for managing memory in computer systems. One embodiment uses a memory table having entries to locate data residing in different types of storage areas, such as physical memory, hard disc, file servers, storage devices, etc. In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid unnecessarily obscuring the invention.

Hardware Overview

Figure 1:
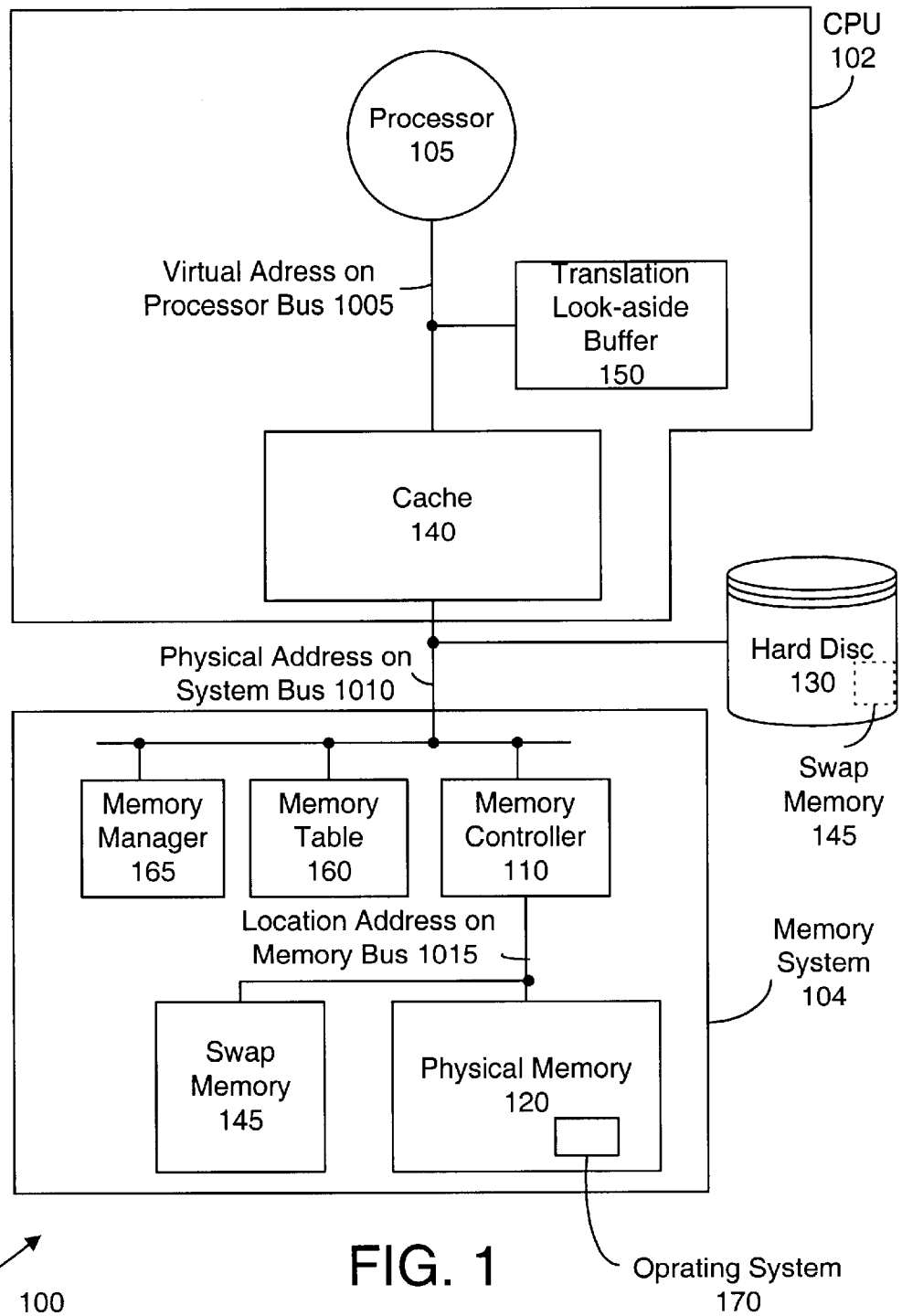
FIG. 1 shows a processor system upon which embodiments of the invention may be implemented.

FIG. 1 shows a uni-processor system 100 upon which embodiments of the invention may be implemented. System 100 includes, in relevant part, a central processing unit (CPU) 102, a memory system 104, and a hard disc 130. CPU 102 in turns includes a processor 105, cache memory 140, and a translation look-aside buffer 150, while memory system 104 includes a memory controller 110, physical memory 120, swap memory 145, a memory table 160, and a memory manager 165. Swap memory 145 is shown with a dotted line in hard disc 130 to indicate that, in one embodiment, swap memory 145, even though being part of memory system 104, physically resides in hard disc 130. Memory system 104 is commonly referred to as main memory from which program instructions are executed and program data are manipulated. System 100 normally runs by an operating system 170 resided in physical memory 120. Processor 105, memory controller 110, physical memory 120, hard disc 130, cache memory 140, translation look-aside buffer 150, and operating system 170 are common computer components.

In this document, the configuration of system 100 shown in FIG. 1 is used only as an example. Any other configuration of a processing system can be effectively used by the techniques disclosed herein. For example, either one or both of cache 140 and look-aside buffer 150 can be part of processor 105, cache 140 may be outside of CPU 102 or part of memory system 104, there may be more than one processor 105 in CPU 102 and different levels of cache 140, etc.

The Memory System

In one embodiment, memory system 104 is designed independently from the size of translation look-aside buffer 150 or the size of the page used by operating system 170. The page size can be set as large as needed and independent of performance issues relating to the overhead of moving and/or copying data between storage areas. Further, translation look-aside buffer 150, working with memory table 160 in memory system 104, has significantly fewer entries as compared to other approaches.

In one embodiment, program executions take place in physical memory 120. Swap memory 145 physically resides in various storage areas including different memory types and/or storage devices, such as dynamic random access memory (DRAM), Rambus DRAM (RDRAM), magnetic RAM (MRAM), static RAM (SRAM), hard disc 130, file servers, different levels of cache and memory, etc. In accordance with the techniques disclosed herein, the above list of storage areas is used as an example only, any device storing data can serve as storage areas. Further, pointers in memory table 160 point to those storage areas. However, operating system 170 sees memory system 104 as one single entity representing the amount of memory in the computer system.

Memory system 104, through memory manager 165, has complete control of all storage areas under it. Commonly, in other approaches, operating system 170 and different software routines control the storage areas. Memory system 104 is also assigned a set of addresses for accessing data. For example, memory system 104 is considered as one block of 1.64 Gb represented by 31-bits addresses, and these addresses cover, for example, 128 Mbs in physical memory 120, 512 Mbs in hard disc 130, and 1 Gbs in one or another variety of storage devices, etc. The size of the storage space for each storage area, in accordance with the techniques disclosed herein, can be conveniently chosen. Data storage covered by memory system 104 is divided into data blocks, each of which, in one embodiment, is 1K. In one embodiment, some storage space chosen in the available storage space is used for administration purposes.

In one embodiment, processor 105, upon an access to memory system 104 for some data, uses the data's virtual address on processor bus 1005, which is translated by translation look-aside buffer 150 to a physical address on system bus 1010. This physical address is used in various approaches to directly access data stored in physical memory corresponding to the virtual addresses on processor bus 1005. However, in accordance with the techniques disclosed herein, memory table 160, in one embodiment, converts the physical addresses on system bus 1010 to location addresses on memory bus 1015 used to locate the requested data in different storage areas. The requested data is then returned to processor 105 or the program accessing the data with the original physical address on system bus 1010.

The Memory Manager

In one embodiment, a state machine is implemented as memory manager 165. Alternatively, a processor or any other mechanism that can perform various tasks for efficient memory management can serve as memory manager 165. These mechanisms include, for example, firmware, field programmable gate arrays (FPGAs), application specific integrated circuits (ASICs), etc., which can be modified easily and operated independent of operating system 170. Memory manager 165, determining appropriate locations for data blocks during program executions, analyzes where, why, and how a particular piece of data is located. Memory manager 165, based on available information and other data sources, places the data so that, when needed, the data is ready in physical memory 120 to be executed, and does not have to be moved from some other locations. Consequently, processor 105 and operating system 170 do not have to be concerned about where the data actual is or how to manage the data.

Memory manager 165 also determines the movement of data blocks between various storage areas. For example, if the data block has been in physical memory 120 for a long time and memory manager 165 determines that the data will not be used in the near future, then memory manager 165 moves that data block out of physical memory 120, e.g., to hard disc 130. Similarly, if the data is to be used frequently, then memory manager 165 moves that data block to physical memory 120. Before moving data to a particular location, memory manager 165 ensures that that location is available for use. For example, if memory manager 165 cannot find some free blocks for use in physical memory 120, then memory manager 165, to make room available, moves some blocks that will not be soon used out of physical memory 120.

In one embodiment, memory manager 165 monitors the movement of data between different storage areas and thus determines the movement pattern from which memory manager 165 stores the data accordingly. For example, if the data is to be processed only once during a program execution, then the data is not brought into physical memory 120. In contrast, if the data is constantly used, then the data is moved to fastest memory, e.g., cache memory, etc. Depending on the situation, memory manager 165 can arrange for the data to be returned when it is needed or place the data in cache 140 or other locations without affecting physical memory 120.

Memory manager 165 also collects information based on which to effectively manage memory system 104. The information can be stored at various convenient locations such as in memory manager 165, in memory table 160, etc. Collected information includes any information that help memory manager 165 to manage the data effectively, such as the number of times a data block has been accessed, the time the data was last accessed, the time a particular piece of data stays at a particular location, etc. Memory manager 165, based on available information, for example, moves the data between system memory 104 and other storage areas, determines if enough free pages are available for a memory access. If free pages are not enough, then memory manager 165 makes room available, e.g., by relocating the data, etc.

In one embodiment, memory manager 165 is provided with information related to the structure of memory system 104 so that memory manager 165 can make informed decisions and effectively perform its tasks. Memory manager 165, having the information, moves and stores data accordingly. If, for example, a particular RAM has a dual bus architecture, then memory manager 165 moves the data in parallel, utilizing both buses at the same time. In other cases, e.g., in a single bus architecture, memory manager 165 moves data serially, etc. Memory manager 165 also takes accounts of other factors, including, for example, the bandwidth of memory bus 1015, the number of memory layers, the type, the bottleneck, and the latency of various memory components, the bus structure of memory types used for swap memory 145 and physical memory 120, the various cache levels and cache locations, etc. In current approaches, operating system 170, which is usually designed for general purposes, does not take into account the internal structure and bottleneck of various components in memory system 104.

Normally, memory manager 165 performs its tasks in the background, e.g., independent from and/or in parallel with system processor 105 and operating system 170. As memory manager 165 does not use processor 105, processor bus 1005, or other processor resources, memory manager 165 does not interfere with processor 105's performance. In one embodiment, memory manager 165, through memory table 165, uses physical address on system bus 1010 to locate the data. In many situations, this physical address was translated from a virtual address.

The Memory Table

Memory table 160 includes entries to locate the requested data stored in different storage areas. In one embodiment, memory table 160 is part of memory controller 110. However, memory table 160 can be at any convenient locations such as in a memory unit, physical memory, main memory, cache, part of the processor, etc. Further, memory manager 165 manages memory table 160. Processor 105, translation look-aside buffer 150, or operating system 170 do not need to know that memory table 160 exists. This is because, in one embodiment, memory system 104, receiving the physical address on system bus 1010, returns the accessed data with the same physical address. In one embodiment, memory table 160 is implemented in hardware such as in random access memory (RAM) or memory controller 110, which normally can be run at high speed and thus does not add significant delay to a memory access.

Figure 2:
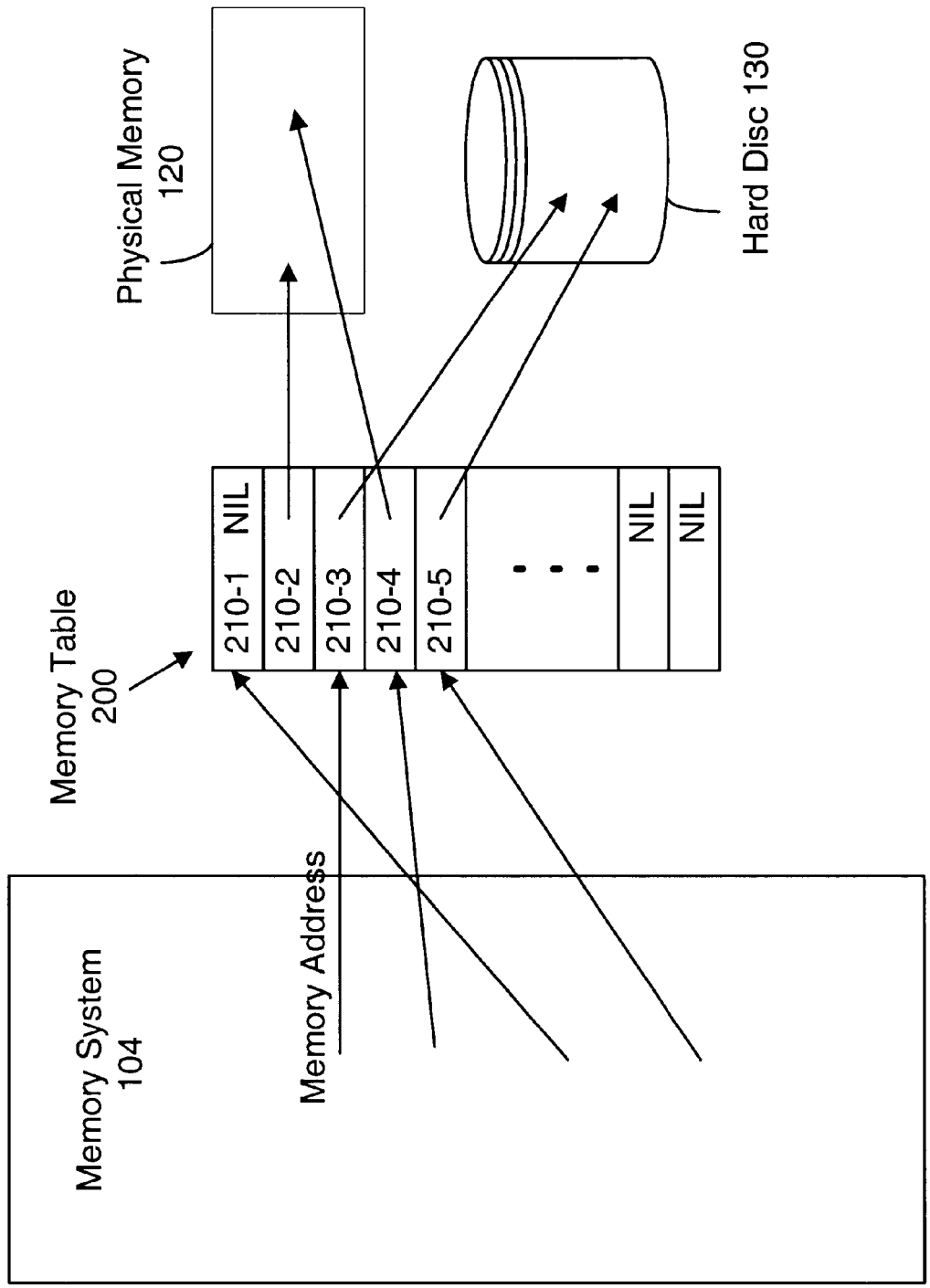
FIG. 2 shows one embodiment of the memory table in FIG. 1.

FIG. 2 shows a memory table 200 as one embodiment of memory table 160. Table 200, being in use with memory system 104, includes a plurality of table entries, e.g., 210-1 to 210-N for N entries. If there is no reference to an actual data block, an entry 210 is "NIL." However, if a data block has been allocated, a corresponding entry 210 points to that data block. In this FIG. 2 example, entries 210-2, 210-3, 210-4, 210-5 point to data blocks located at various random locations in both physical memory 120 and hard disc 130. Further, physical memory 120 and hard disc 130 are shown as only an example, the data blocks can be in various different storage areas, in accordance with the techniques disclosed herein.

Entries of Memory Table

Normally, memory table 160 includes enough entries 210 to cover all data blocks of memory system 104 as seen by processor 105 and operating system 170. For example, memory table 160 contains 1.64 million entries covering 1.64 million blocks resulted from a 1.64 G memory system 104 having each data block of 1K. Further, each entry 210 corresponds to a block covering a physical address range. For example, entry 1 corresponds to block 1 covering physical addresses 0 to 1023, entry 2 corresponds to block 2 covering physical addresses 1024 to 2047, and entry 3 corresponds to block 3 covering physical addresses 2048 to 3071, etc. Additionally, 22 bits, e.g., bits 10 to 31 of physical address on system bus 1010 are used to perform a translation lookup, i.e., to find an entry, in memory table 160. The example uses a simple addressing scheme to perform the translation table look-up, but, in accordance with the technique disclosed herein, a hash table or any other effective method can be used for such a translation lookup. Bits 10 to 31 actually address 2 million blocks; processor 105 should not send a memory access that is beyond the range of translation table 160. If processor 105 does send such an access, then translation table 160 marks the access as invalid.

In one embodiment, each entry 210 includes a "valid" bit, an "updating location bit," and a "static" bit. The valid bit indicates whether the data block pointed to by the corresponding entry has been initialized. In one embodiment, if the data block is initialized, then the valid bit is set, e.g., having a logic "one" value, and if the data block is not initialized, then the valid bit is reset, e.g., having a logic "zero" value. The updating-location bit indicates whether an access to the data block is allowable. For example, if a table entry 210 is being modified or if the data block is being in transit from one location to another location, then the updating-location bit for that entry 210 is set, and a memory access to the data block is buffered during the time this updating-location bit is set. When this updating-location bit is reset, e.g., the table entry 210 is completely modified and the block is settled in its location, accessing the block is then allowable, and any buffered accesses are completed. The static bit indicates whether a particular data block must always be in physical memory 120, and cannot moved to any other location. In one embodiment, if the static bit is set, then the data block cannot be moved out of physical memory 120. In one embodiment, the valid bit can be replaced by using an invalid entry located in the memory table entry. Memory manager 165 detects invalid entries by testing the address stored in the memory table entry instead of using a special bit.

In one embodiment, entries 210 also store statistical information about their corresponding data blocks, such as how long the data blocks have been staying at a particular location, the number of time the block has been accessed during some time period, etc. Memory manager 165 then uses the statistical information accordingly, e.g., to determine when and where to move the data blocks, etc.

Translating from a Virtual Address to a Location Address

Figure 3:
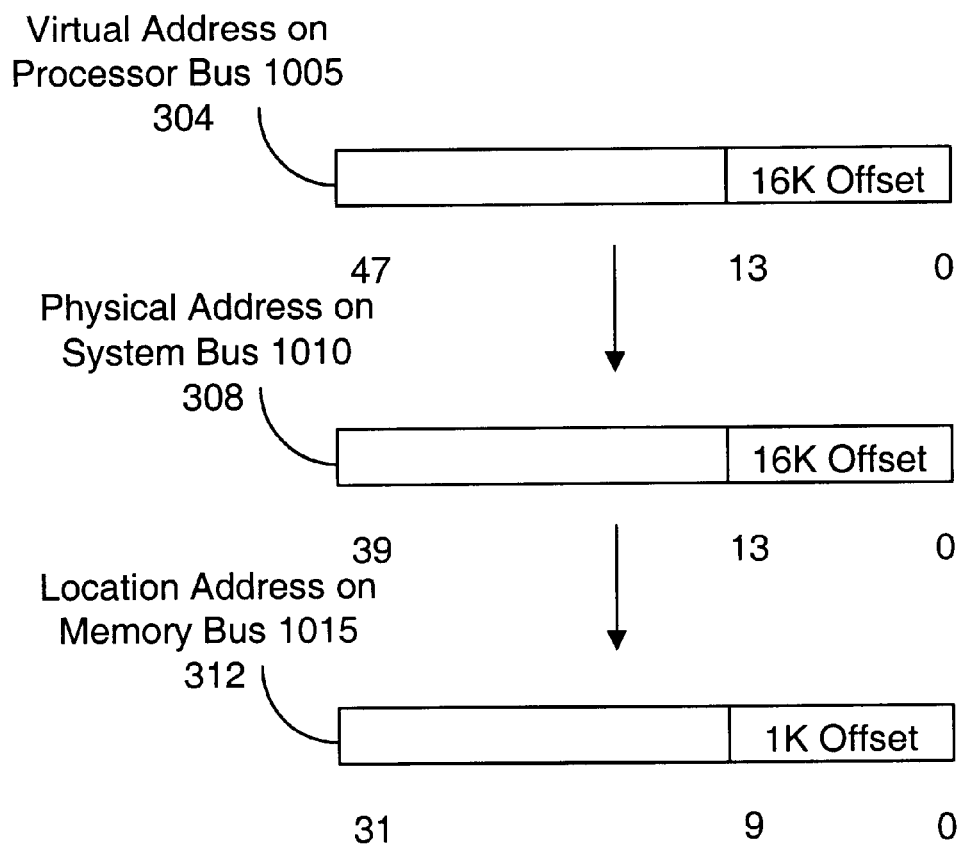
FIG. 3 is used to illustrate converting a virtual address to a physical address and then a relocation address used to identify data blocks.

Referring to FIG. 3 for an illustration of converting a virtual address on processor bus 1005 in FIG. 1 to a physical address on system bus 1010, and then to a location address on memory bus 1015, upon a memory access. A location address identifies a data block. In this example, the virtual address is 48 bits, memory system 104 is assigned 32 bits representing 1.64 Gb from addresses 0 to 1.64 Gb−1 seen by processor 105 and operating system 170. A page is 16K while a data block is 1K.

Box 304 shows the 48-bit virtual address represented by bits 0–47 in which bits 0–13 represent a 16K page. Each representation of bits 0–13 serves as an offset for accessing the page. Thirty four bits 14–47 represent the virtual page numbers covering all 2**34 pages in the virtual address space.

Box 308 shows a 40-bit physical address, represented by bits 0–39. In other approaches, these bits are used to directly access data in physical memory 120. Each representation of bits 0–13 also serves as an offset for accessing data in a 16K page. Bits 14–39 are translated from bits 14–47 in box 304, using translation look-aside buffer 150.

Box 312 shows a 32-bit location address used for finding data blocks covered by 1.64 Gb memory system 104. Ten bits, e.g., bits 0–9, are used to locate data in a data block of 1K. Bits 10–31, being converted from bit 10–31 in box 308, are used to lookup in memory table 160 to identify the location of a data block. In the example of memory system 104, if bits 10–31 are translated to a location address from 0 to 128M−1, 128M to 640M−1, and 640M to 1.64 GB−1, then the data block is in physical memory 120, hard disc 130, and other storage areas, respectively. Bits 0–9 are then used to convert to a location address in the identified data block.

Creation of the Memory Table and Data Blocks

In one embodiment, memory table 160 implemented in hardware is created when the computer system is designed, and memory manger 165 initializes it at boot time. In this embodiment, a certain amount of hardware space is allocated for table 160 and for entries 210. In an alternative embodiment where table 160 is implemented in firmware or software, memory manager 165, upon booting up, both creates and initializes table 160. Table 160 can be created having a fixed size or a variable size in which some space is first allocated and additional space is appended as necessary. When table 160 is initially created, all entries 210 are "NIL," indicating that entries 210 do not point to any data block.

In one embodiment, memory manager 165 does not need to know the page size or the steps that operating system 170 does in preparation for allocating memory pages. In this embodiment, data blocks are created when operating system 170, through its memory management routines, allocates memory pages, which occurs when operating system 170 first write data to that page. In subsequent writes, memory manager 165, having the address of the data, performs a table lookup in memory table 160 to determine whether a data block corresponding to the data has been created. If the entry corresponding to the data is NIL, which indicates that the corresponding data block has not been created, then memory manager 165 creates the data block, and allows operating system 170 to write the data to that newly created block. However, if the data block has been created, then memory manger 165 allows operating system 170 to write the data to the already-created block without creating one.

In an alternative embodiment, operating system 170, upon initializing memory pages, provides memory manager 165 with the page-creation information, e.g., informs memory manager 165 that operating system 170 starts allocating a particular page having a particular size and being at a particular location, etc. In this embodiment, memory manager 165 creates all data blocks required to hold the newly allocated page. Memory manager 165, knowing the size of the page, creates corresponding blocks having desired sizes. Further, memory manager 165, having the physical address range of the page, corresponds the address ranges for each created data block, and as operating system 170 writes data to the page, memory manager 165, having the physical address of the data, redirects the data to the corresponding data blocks. Memory manager 165 continuously creates data blocks as long as operating system 170 sends new addresses, since operating system 170 knows the combined size of all storage in memory system 104 and will not allocate more memory than can be held by the data blocks. In various embodiments, data blocks can be of the same size or different sizes, and operating system 170, writing data to the data blocks, believes that it is writing data to a page.

In one embodiment, memory manager 165 has total discretion to place data blocks in different locations, e.g., in physical memory 120, hard disc 130, or other storage areas, etc. For each data block that has been placed in a particular location, a corresponding table entry 210 is updated with information to locate the data block. In one embodiment, memory manager 165, without sufficient information, places data blocks in fastest memory so that, when needed, the data can be quickly accessed. As additional information is available, memory manager 165 moves the data block to appropriate locations, in accordance with the techniques disclosed herein.

Method Steps in Accordance with One Embodiment

Figure 4:
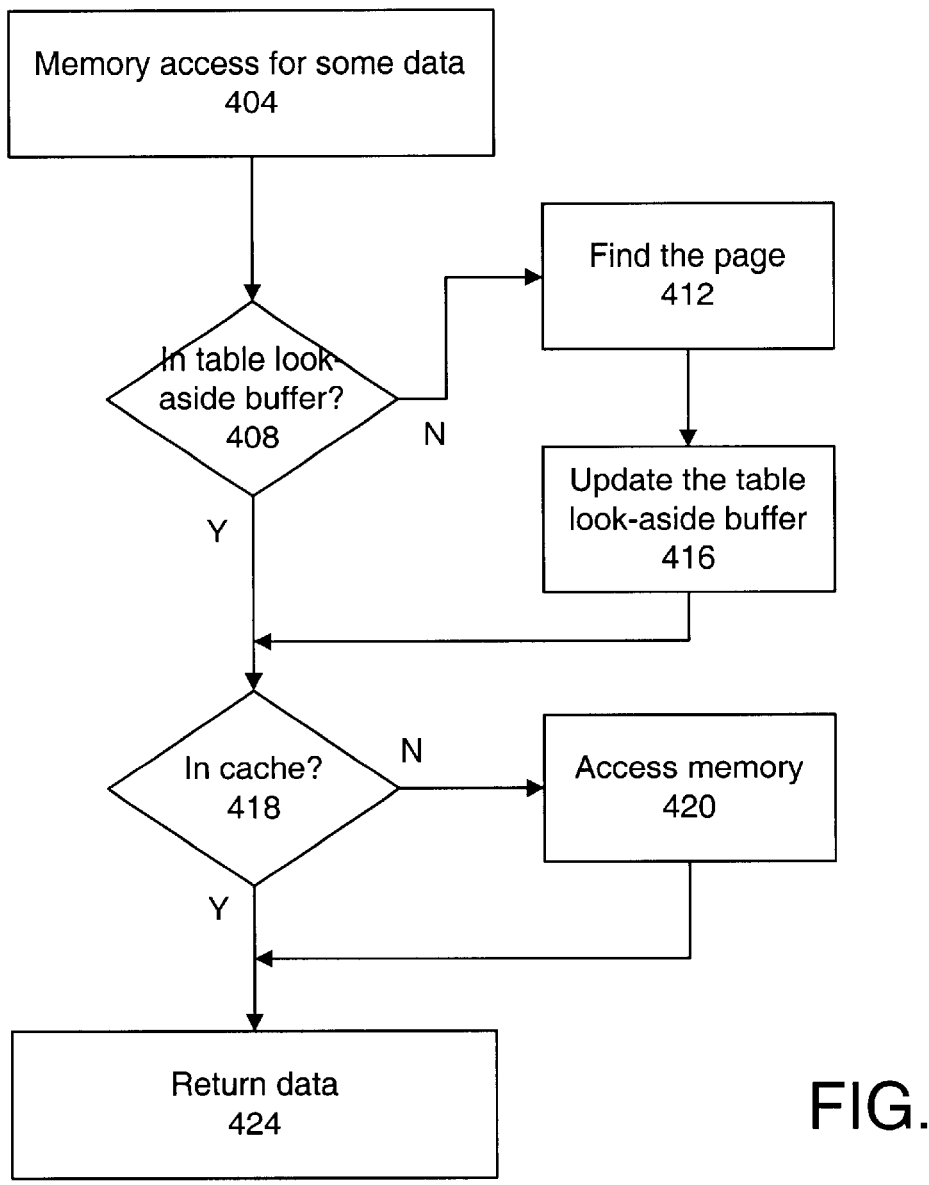
FIG. 4 is a flowchart illustrating a memory access.

FIG. 4 is a flowchart illustrating a method for accessing memory system 104 in accordance with one embodiment. In step 404, a program is performing a memory access for some data. In one embodiment, the program uses a virtual address of the data for this memory access. Those skilled in the art will recognize that a memory access includes finding a memory page having the address to be accessed.

In step 408, it is determined whether the accessed page is in translation look-aside buffer 150. If the page is not in translation look-aside buffer 150, then in step 412 operating system 170 finds the page, and in step 416 translation look-aside buffer 150 is updated to reflect that the page is in translation look-aside buffer 150.

In step 418, it is determined whether the requested data is in cache 140. If the data is in cache 140, then the data is returned to the program in step 424. However, if the data is not in cache 140, then a memory access is performed in step 420, and after a successful memory access the data is returned in step 424. In one embodiment, the data is returned to the program with the original physical address provided to memory system 104.

In the above illustration, determining whether the page is in translation look-aside buffer 150 and in cache 140 can be done in parallel.

Figure 5:
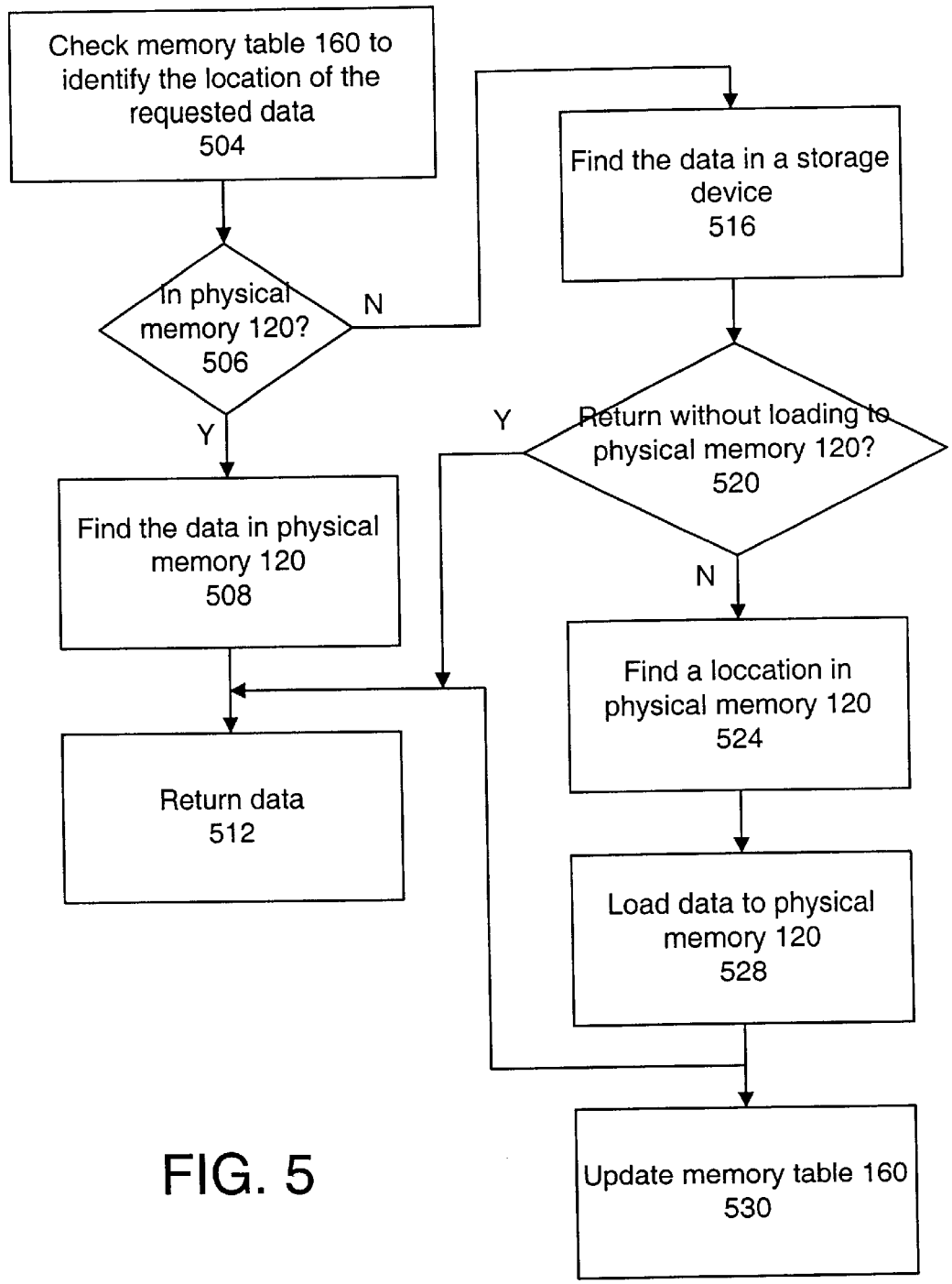
FIG. 5 is a flowchart detailing step 420 in the flowchart of FIG. 5.

FIG. 5 is a flowchart detailing the step 420 in FIG. 4. In step 504, memory table 160 is checked to identify the location of the requested data. It is determined in step 506 whether the data is in physical memory 120. If the data is in physical memory 120, then, in step 508, the address in memory table 160 and the lower bits of physical address on system bus 1010 are used to find the data in such memory. The data is then returned in step 512 to the program requesting the data.

However, if the data is not in physical memory 120, then, in step 516, the data is found in a storage device, e.g., hard disc 130. It is determined in step 520 whether the data should be returned directly to the requesting program, without being loaded to physical memory 120. If so, then the data is returned in step 512. If the data should be loaded to physical memory 120, then memory manager 165 in step 524 finds a location in physical memory 120 to hold the data block containing the requested data. In this step 524, it is assumed that memory manager 165 is able to find a holding location. If a holding location is not initially available, then memory manager 165 takes appropriate actions to make such holding location available. In step 528, memory manager 165 loads the data, e.g., from hard disc 130 to physical memory 120. The data is then returned in step 512, and memory manager 165 in step 524 updates memory table 160 to reflect the new location of the data.

In accordance with the techniques disclosed herein, many of the above steps may be done in parallel. For example, returning the data in step 512 may be done in parallel with updating memory table 160 in step 530 or in parallel with loading the data in step 528. Further, in the background, memory manager 165 moves the data to different storage areas as appropriate. Those skilled in the art will recognize that step 512 in this FIG. 5 is equivalent to step 424 in FIG. 4.

Benefit of the Invention

The techniques disclosed herein significantly reduce the complexity of operating system 170. Because memory system 104 in various embodiments works independently from processor 105 and operating system 170, the pressure on the number of entries in translation look-aside buffer 150 and the conflicting effects of increasing or decreasing the memory page sizes are removed. Constructing translation look-aside buffer 150 with significantly fewer entries is also allowable. For example, hardware designers can fix the size of translation look-aside buffer 150, and software engineers can fix the page size without taking into account the design of memory system 104.

Accessing memory system 104 is much faster and simpler than in other approaches in which an operating system manages such an access. This is because operating system 170 in various embodiments does not manage and does not need to know where the returned data from memory system 104 comes from, e.g., physical memory 120, hard disc 130, or other storage areas, etc. In many current approaches, if the data is not in physical memory 120, then the operating system usually has to go through various complicated managing scheme to determine the location of the data, e.g., in swap memory, etc. Once the location has been identified, the operating system also has to go through complex processes to load the data to physical memory to be used from there. The operating system also has to update appropriate data structures and/or link lists, and inform the system processor or the program requesting the data that the data is ready for use. In contrast, in various embodiments of the techniques disclosed herein, the data may be returned directly to the program without being loaded to physical memory 120. Even if the data is to be loaded to physical memory 120, loading is fast and can be done in background for maximum efficiency. By keeping the correct data blocks in physical memory 120, the latencies of moving pages from other storage locations can be minimized, and the complications of the operating performing memory paging are also removed.

Because the storage space in physical memory 120 can be combined with that of hard disc 130 and other storage areas to result in one memory entity, operating system 170 can see and thus behave as if there is a much larger memory system 104. This relieves operating system 170 from complicated memory management issues including page movement. In the FIG. 1 example, physical memory 120 is only 128 Mb while operating system 170 sees memory system 104 as a 1.64 Gb memory entity.

Computer System Overview

Figure 6:
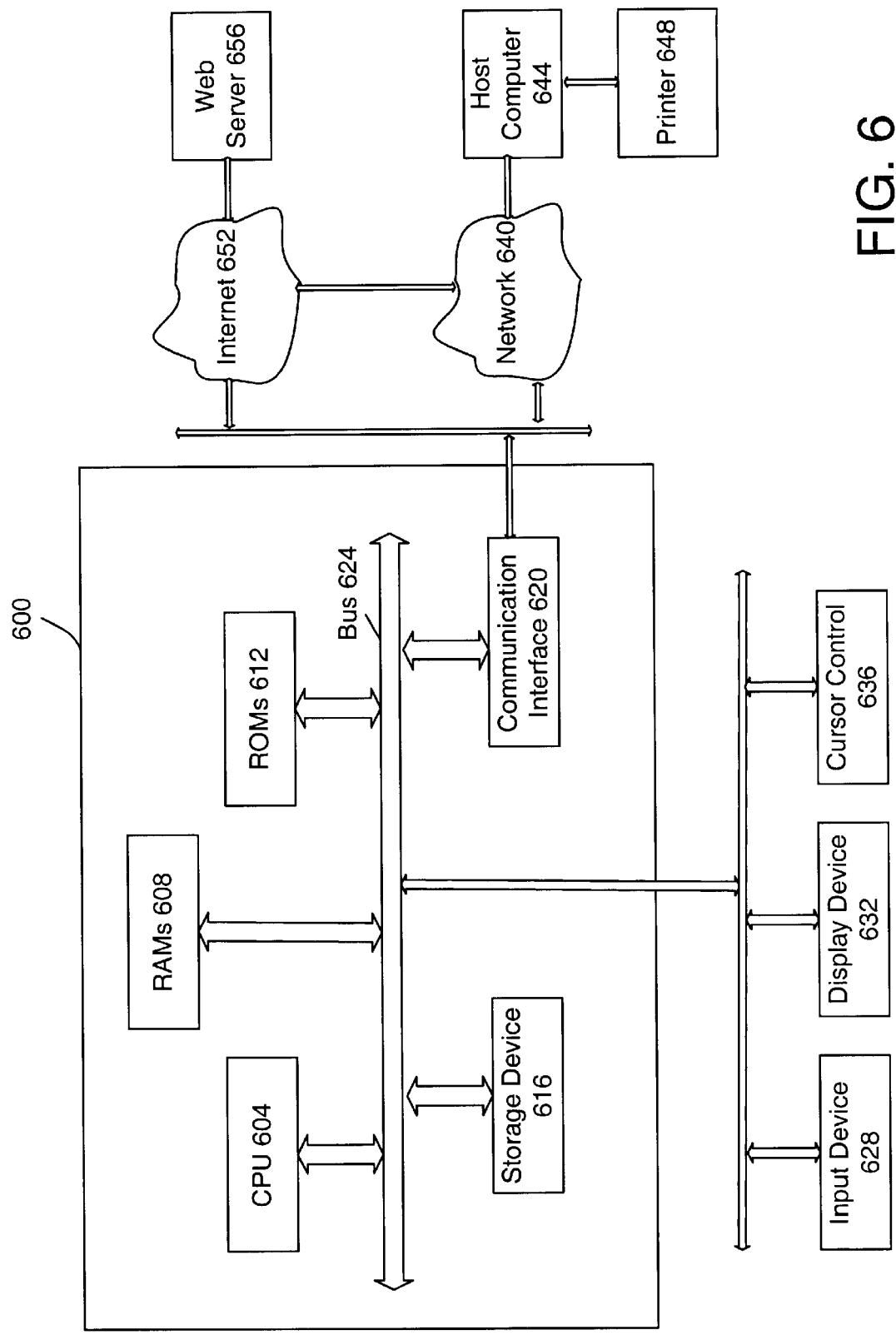
FIG. 6 shows an exemplary computer system upon which embodiments of the invention may be implemented.

FIG. 6 is a block diagram showing a computer system 600 upon which an embodiment of the invention may be implemented. For example, computer system 600 may be implemented to include system 100. In one embodiment, computer system 600 includes a processor 604, random access memories (RAMs) 608, read-only memories (ROMs) 612, a storage device 616, and a communication interface 620, all of which are connected to a bus 624.

Processor 604 controls logic, processes information, and coordinates activities within computer system 600. In one embodiment, processor 604 executes instructions stored in RAMs 608 and ROMs 612, by, for example, coordinating the movement of data from input device 628 to display device 632.

RAMs 608, usually being referred to as main memory, temporarily store information and instructions to be executed by processor 604. Information in RAMs 608 may be obtained from input device 628 or generated by processor 604 as part of the algorithmic processes required by the instructions that are executed by processor 604.

ROMs 612 store information and instructions that, once written in a ROM chip, are read-only and are not modified or removed. In one embodiment, ROMs 612 store commands for configurations and initial operations of computer system 600.

Storage device 616, such as floppy disks, disk drives, or tape drives, durably stores information for used by computer system 600.

Communication interface 620 enables computer system 600 to interface with other computers or devices. Communication interface 620 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 620 may also allow wireless communications.

Bus 624 can be any communication mechanism for communicating information for use by computer system 600. In the example of FIG. 6, bus 624 is a media for transferring data between processor 604, RAMs 608, ROMs 612, storage device 616, communication interface 620, etc.

Computer system 600 is typically coupled to an input device 628, a display device 632, and a cursor control 636. Input device 628, such as a keyboard including alphanumeric and other keys, communicates information and commands to processor 604. Display device 632, such as a cathode ray tube (CRT), displays information to users of computer system 600. Cursor control 636, such as a mouse, a trackball, or cursor direction keys, communicates direction information and commands to processor 604 and controls cursor movement on display device 632.

Computer system 600 may communicate with other computers or devices through one or more networks. For example, computer system 600, using communication interface 620, communicates through a network 640 to another computer 644 connected to a printer 648, or through the world wide web 652 to a server 656. The world wide web 652 is commonly referred to as the "Internet." Alternatively, computer system 600 may access the Internet 652 via network 640.

Computer system 600 may be used to implement the techniques described above. In various embodiments, processor 604 performs the steps of the techniques by executing instructions brought to RAMs 608. In alternative embodiments, hard-wired circuitry may be used in place of or in combination with software instructions to implement the described techniques. Consequently, embodiments of the invention are not limited to any one or a combination of software, hardware, or circuitry.

Instructions executed by processor 604 may be stored in and carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, a CD-RAM, a DVD-ROM, a DVD-RAM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic, or light waves, etc. As an example, the instructions to be executed by processor 604 are in the form of one or more software programs and are initially stored in a CD-ROM being interfaced with computer system 600 via bus 624. Computer system 600 loads these instructions in RAMs 608, executes some instructions, and sends some instructions via communication interface 620, a modem, and a telephone line to a network, e.g. network 640, the Internet 652, etc. A remote computer, receiving data through a network cable, executes the received instructions and sends the data to computer system 600 to be stored in storage device 616.

Computer system 600 may be implemented to include system 100. For example, CPU 604 may be implemented as CPU 102, RAM 608 as memory system 104, storage device 616 as hard disc 130, etc.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for managing a memory system, comprising the steps of:
    providing a memory table having entries pointing to data blocks that reside in various locations of different storage areas including physical memory; and
    upon a program accessing memory for a particular piece of data, the memory table using a physical address of a memory page corresponding to the piece of data to convert to a location address corresponding to an entry pointing to the location of the piece of data;
    wherein a memory manager manages the data blocks independent of an operating system and a processor unit executing the program accessing memory, including managing locations and movements of the data blocks.

2. The method of claim 1 further comprises the step of allocating the data blocks corresponding to the memory page upon receiving information that the memory page is about to be initialized.

3. The method of claim 1 further comprises the step of allocating a data block corresponding to the memory page upon receiving a write to a physical address that does not correspond to data blocks that have been allocated.

4. The method of claim 1 further comprises the step of corresponding an entry of the memory table to a data block.

5. The method of claim 1 further comprises the step of presenting the physical memory and the different storage areas to the operating system and the processor unit as a single memory entity.

6. The method of claim 1 further comprises the steps of returning the piece of data to the program directly from the location storing the piece of data; and
    skipping a step of loading the piece of data to the physical memory.

7. The method of claim 1 further comprises the step of the memory manager using collected information to determine the location of a data block.

8. The method of claim 7 further comprises the step of selecting the collected information in one or a combination of
    the movement paffern of the data in the data block;
    the structure of the memory system;
    the cache-level architecture in the memory system.

9. The method of claim 1 further comprising the step of selecting the storage areas in one or a combination of different memory types and storage devices.

10. A device for managing a memory system, comprising:
    a memory table having entries pointing to data blocks that reside in various locations of different storage areas including physical memory; wherein upon a program accessing memory for a particular piece of data, the memory table uses a physical address of a memory page corresponding to the piece of data to convert to a location address corresponding to an entry pointing to the location of the piece of B data; and
    a memory manager manages the data blocks independent of an operating system and the processor unit executing the program accessing memory, including managing locations and movements of the data blocks.

11. The device of claim 10 wherein the memory manager allocates the data blocks corresponding to the memory page upon receiving information that the memory page is about to be initialized.

12. The device of claim 10 wherein the memory manager allocates a data block corresponding to the memory page upon receiving a write to a physical address that does not correspond to data blocks that have been allocated.

13. The device of claim 10 wherein the memory manager corresponds an entry of the memory table to a data block.

14. The device of claim 10 wherein the processor and the operating system perceive the physical memory and the different storage areas to the operating system as a single memory entity.

15. The device of claim 10 wherein
    the memory manager returns the piece of data to the program directly from the location storing the piece of data; and
    the memory manager skips loading the piece of data to the physical memory.

16. The device of claim 10 wherein the memory manager uses collected information to determine the location of a data block.

17. The device of claim 16 wherein the collected information is selected in one or a combination of
    the movement pattern of the data in the data block;
    the structure of the memory system;
    the cache-level architecture in the memory system.

18. The device of claim 10 wherein the storage areas are selected in one or a combination of different memory types and storage devices.

19. A computer-readable medium storing instructions for a computer to perform a method for managing a memory system, the method comprising the steps of:
    providing a memory table having entries pointing to data blocks that reside in various locations of different storage areas including physical memory; and
    upon a program accessing memory for a particular piece of data, the memory table using a physical address of a memory page corresponding to the piece of data to convert to a location address corresponding to an entry pointing to the location of the piece of data;
    wherein a memory manager manages the data blocks independent of an operating system and a processor unit executing the program accessing memory, including managing locations and movements of the data blocks.

20. The computer-readable medium of claim 19 wherein the method further comprises the step of presenting the physical memory and the different storage areas to the operating system and the processor unit as a single memory entity.

* * * * *

UNITED STATES PATENT AND TRADEMARK OFFICE
CERTIFICATE OF CORRECTION

PATENT NO. : 7,103,747 B2  
APPLICATION NO. : 09/896043  
DATED : September 5, 2006  
INVENTOR(S) : Kenneth Mark Wilson et al.

Page 1 of 1

It is certified that error appears in the above-identified patent and that said Letters Patent is hereby corrected as shown below:

In column 12, line 43, in Claim 8, delete "paffern" and insert -- pattern --, therefor.

In column 12, line 49, in Claim 10, after "comprising:" insert -- a processor unit; --.

In column 12, line 57, in Claim 10, delete "B" before "data".

Signed and Sealed this

Seventeenth Day of March, 2009

JOHN DOLL  
*Acting Director of the United States Patent and Trademark Office*